United States Patent [19]

Murota

[11] Patent Number: 4,838,764
[45] Date of Patent: Jun. 13, 1989

[54] OIL PUMP FOR TRANSAXLE

[75] Inventor: Kazuya Murota, Ebina, Japan

[73] Assignee: Nissan Motor Co., Ltd., Yokohama, Japan

[21] Appl. No.: 176,013

[22] Filed: Mar. 31, 1988

[30] Foreign Application Priority Data

Mar. 31, 1987 [JP] Japan .................................. 62-79335

[51] Int. Cl.⁴ ......................... F04B 21/00; F04C 15/00
[52] U.S. Cl. ................................ 418/170; 74/606 R; 184/6.12; 184/31
[58] Field of Search ............... 418/166, 169, 170, 171; 184/6.12, 31; 74/606 R; 417/434

[56] References Cited

U.S. PATENT DOCUMENTS

| 3,053,115 | 9/1962 | Cartwright et al. | 74/606 R |
| 4,098,143 | 7/1978 | Kubo et al. | 74/606 R |
| 4,203,331 | 5/1980 | Shindo et al. | 74/606 R |
| 4,255,093 | 3/1981 | Erikson | 418/170 X |

Primary Examiner—Leonard E. Smith
Attorney, Agent, or Firm—Foley & Lardner, Schwartz, Jeffery, Schwaab, Mack, Blumenthal & Evans

[57] ABSTRACT

An oil pump cover includes an annular rib receiving therein an oil pump housing and a flange section extending radially outward of the annular rib. The flange section is formed with a cutout to receive a final drive pinion on a counter shaft of an automatic transaxle. Thus, the final drive pinion is disposed in the vicinity of the annular rib.

6 Claims, 3 Drawing Sheets

OIL PUMP FOR TRANSAXLE

RELATED APPLICATIONS

The following five U.S. Patent Applications have been concurrently filed with the present application and are to be commonly assigned herewith. They disclose subject matters which are related to the subject matter of the present application.

1. U.S. patent application Ser. No. 176,012 (our ref.: U063-88), filed by Hiromi TAGUCHI, claiming priority on Japanese Utility Model Application No 62-46997 with a filing date of Mar. 31, 1987;
2. U.S. patent application Ser. No. 176,011, filed by Kazuya MUROTA et al., claiming priority on Japanese Patent Application No 62-79334 with a filing date of Mar. 31, 1987;
3. U.S. Patent Application Serial No. 176,007, filed by Kazuya MUROTA, claiming priority on Japanese Patent Application No 62-7933 with a filing date of Mar. 31, 1987;
4. U.S. patent application Ser. No. 176,017, filed by Hiromi TAGUCHI, claiming priority on Japanese Utility Model Application No 62-46999 with a filing date of Mar. 31, 1987;
5. U.S. patent application Ser. No. 176,016, filed by Hiromi TAGUCHI, claiming priority on Japanese Patent Application No 62-79331 with a filing date of Mar. 31, 1987:

BACKGROUND OF THE INVENTION

The present invention relates to an oil pump for a transaxle, and more particularly to an oil pump cover of an oil pump for an automatic transaxle.

An automatic transaxle is commonly used as a power unit of a front engine front wheel drive vehicle or a rear engine rear wheel drive vehicle. The automatic transaxle comprises an automatic transmission and a diferential gear.

An automatic transaxle is known which comprises a counter shaft arranged in parallel to an axis of a transmission gearing having an input connected to a torque converter and an output delivering a torque to the counter shaft, and the torque delivered to the counter shaft is then delivered via a final drive to a differential gear. This arrangement is advantageous in that the differential gear can be located at the middle between a left and a right driving wheels, resulting in a reduction in a difference between the lengths of driving axles. This automatic transaxle includes an oil pump which serves as a source of pressurized oil used for activation of various gear shifting friction elements. The oil pump is driven by an engine via a pump impeller of the torque converter and thus arranged between the torque converter and the transmission gearing and the final drive pinion is disposed radially outward of the oil pump. Typical examples of the above mentioned known transaxle are an automatic transaxle of the RN4F02A type manufactured by Nissan Motor Company Limited and an automatic transaxle of the A240E type manufactured by Toyota Motor Company Limited.

An object of the present invention is to provide an oil pump which gives an arrangement wherein the distance between the axis of the final drive pinion and the axis of the oil pump is reduced, thus suppressing an increase in radial dimension of a transaxle at a portion where the final drive pinion and the oil pump are disposed.

SUMMARY OF THE INVENTION

According to one aspect of the present invention, there is provided an oil pump cover includig an annular rib receiving therein an oil pump housing and a flange section extending radially outward of the annular rib. The flange section is formed with a cutout to receive a final drive pinion on a counter shaft of an automatic transaxle. Thus, the final drive piston is disposed in the vicinity of the annular rib.

According to another aspect of the present invention, there is provided an oil pump comprising:

a pump casing including a pump housing formed with a recess receiving therein movable pump elements including a pump element rotatable about an axis, and a pump cover secured to said pump housing, said pump cover including an integral flange section extending radially outward of said pump housing with regard to said axis;

said pump cover being formed with an oil inlet opening and an oil outlet opening at said flange section, a pump inlet port and a pump discharge port, an inlet passage extending from said inlet opening to said pump inlet port, and an outlet passage extending from said pump discharge port to said outlet opening;

said flange section being cutout at a portion disposed radially outward of said pump inlet port with regard to said axis.

According to still another aspect of the present invention, there is provided an oil pump for a transaxle including a transmission casing, a main axis and an auxiliary axis which a final drive pinion on a counter shaft is rotatable about, said oil pump comprising:

a pump casing including a pump housing formed with a recess receiving therein movable pump elements including a pump element rotatable about the main axis, and a pump cover secured to said pump housing, said pump cover including an integral flange section extending radially outward of said pump housing with regard to the main axis, said integral flange section being secured to the transmission;

said pump cover being formed with an oil inlet opening and an oil outlet opening at said flange section to receive oil via the transmission casing and supply pressurized oil via the transmission casing, a pump inlet port and a pump discharge port, an inlet passage extending from said inlet opening to said pump inlet port, and an outlet passage extending from said pump discharge port to said outlet opening;

said flange section being cutout at a portion disposed radially outward of said pump inlet port with regard to said axis to receive therein the final drive pinion.

According to still further aspect of the present invention, there is provided an oil pump for a transaxle including a transmission casing, a main axis and an auxiliary axis which a final drive pinion on a counter shaft is rotatable about, said oil pump comprising:

a pump casing including a pump housing formed with a recess receiving therein an outer gear and an inner gear rotatable about the main axis, and a pump cover secured to said pump housing, said pump cover including an annular rib receiving therein said pump housing and an integral flange section extending radially outward of said annular rib with regard to said axis;

said pump cover being formed with an oil inlet opening and an oil outlet opening at said flange section, a pump inlet port and a pump discharge port which are disposed inside of said annular rib, an inlet passage extending from said inlet opening to said pump inlet port, and an outlet passage extending from said pump discharge port to said outlet opening;

said pump cover being formed with a plurality of circuit passages including at least one circuit passage crossing said pump discharge port, said pump cover being formed with an elevated portion in said pump discharge port through which said at least one circuit passage extends;

said flange section being cutout at a portion disposed radially outward of said pump inlet port with regard to said main axis to receive therein the final drive pinion.

According to still further aspect of the present invention, there is provided an arrangement in an automatic transaxle, said arrangement including:

a transmission casing having a main axis;

a counter shaft within said transmission casing and rotatable about an auxiliary axis extending in parallel to said main axis;

a final drive pinion on said ounter shaft;

an oil pump casing including a pump housing formed with a recess receiving therein movable pump elements including a pump element rotatable about the main axis, and a pump cover secured to said pump housing, said pump cover including an integral flange section extending radially outward of said pump housing with regard to the main axis, said integral flange section being secured to the transmission;

said pump cover being formed with an oil inlet opening and an oil outlet opening at said flange section secured to said transmission casing, a pump inlet port and a pump discharge port, an inlet passage extending from said inlet opening to said pump inlet port, and an outlet passage extending from said pump discharge port to said outlet opening;

said flange section being cutout at a portion disposed radially outward of said pump inlet port with regard to said axis to receive therein said final drive pinion.

DETAILED DESCRIPTION OF THE INVENTION

Figure 2:
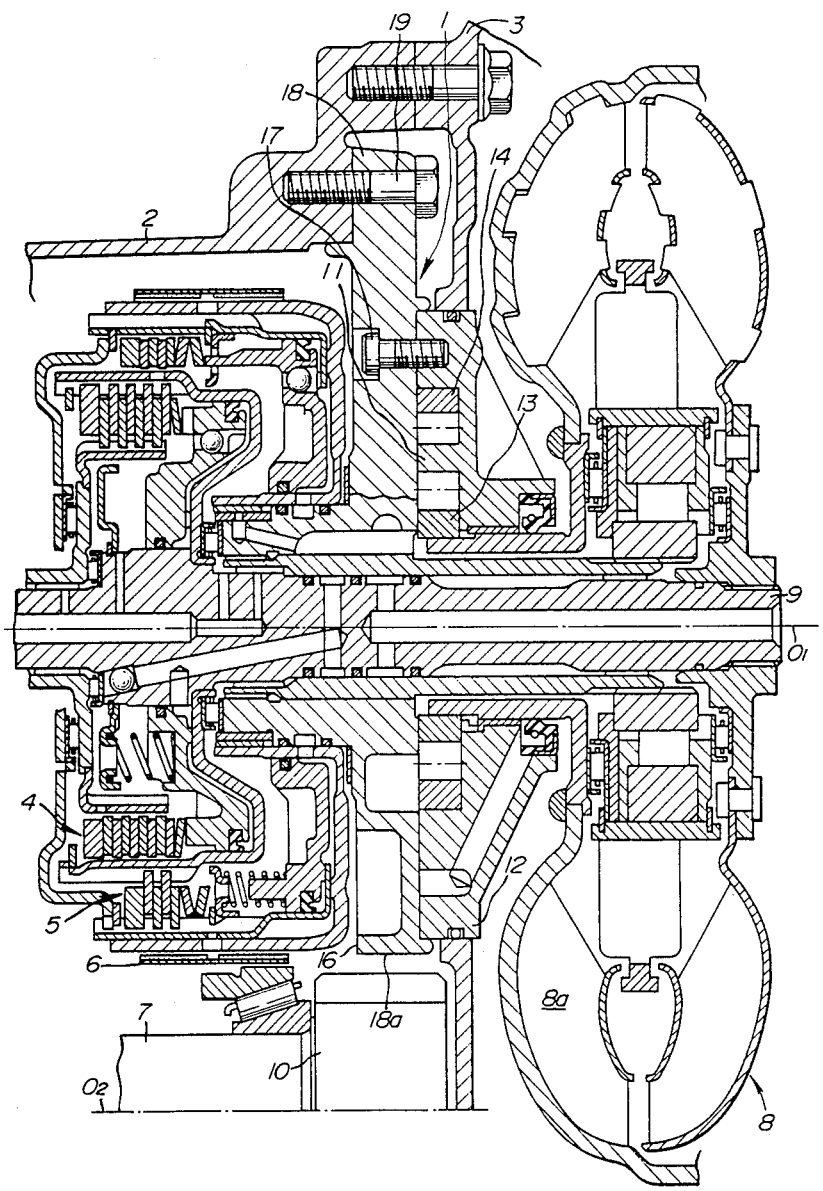
FIG. 2 is a fragmentary section taken through the line II—II of FIG. 1 showing the oil pump in its installation state in the automatic transaxle.

Referring to FIG. 2, an automatic transaxle comprises a transmission casing 2 and a converter housing 3 which are securely bolted to each other. Within the transmission case 2 is a transmission gearing arranged around a main axis $O_1$. The transmission gearing includes a high clutch 4, a reverse brake and a band brake 6. Arranged also within the transmission case 2 is a counter shaft 7. The counter shaft 7 is supported for rotation about a auxiliary axis $O_2$ extending in parallel to the main axis $O_1$.

Figure 1:
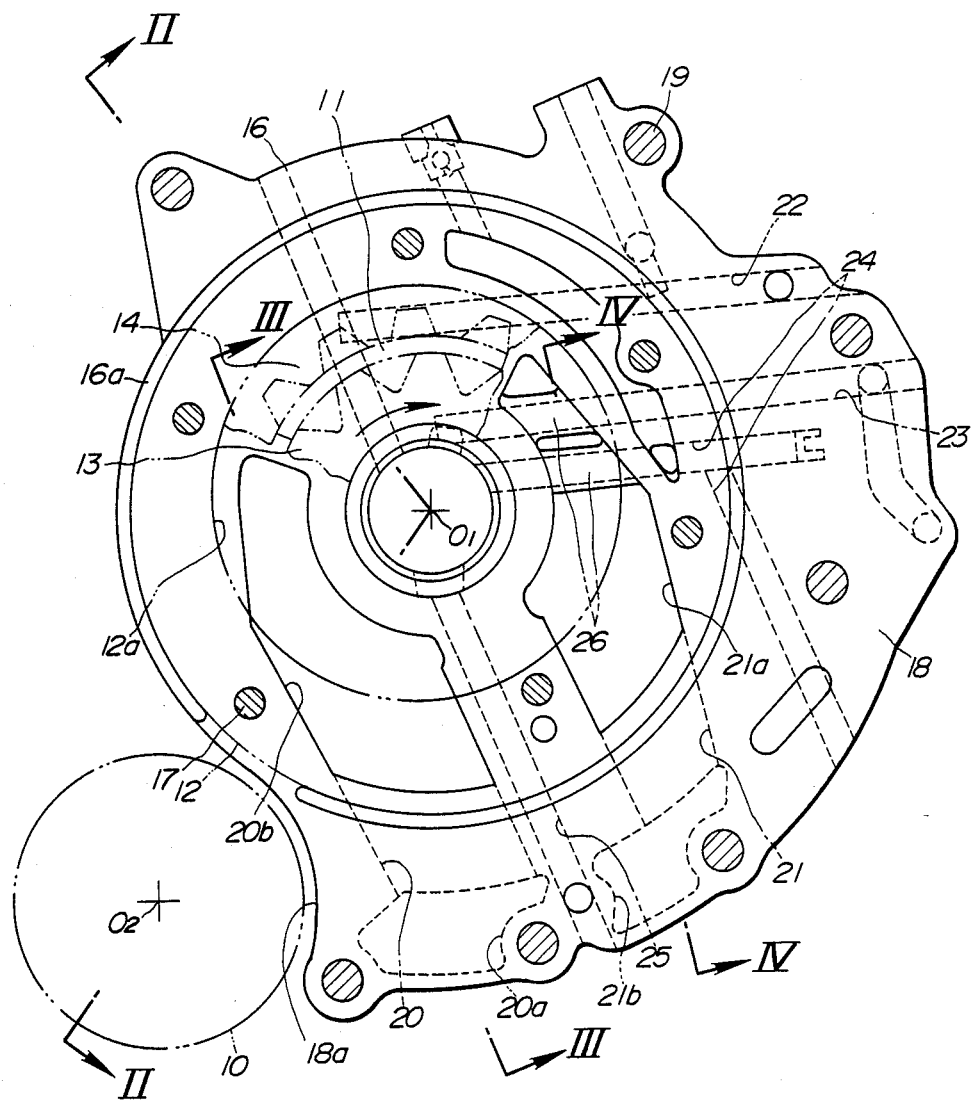
FIG. 1 is a plan view of an oil pump cover of an oil pump according to the present invention with an oil pump housing thereof shown in phantom and a final drive pinion of an automatic transaxle shown in phantom.

Referring also to FIG. 1, an oil pump generally designated by the reference numeral 1 comprises an oil pump casing including an oil pump housing 12 formed with a circular recess defined by an annular wall 12a. Disposed in this circular recess is an outer gear 14 which is internally toothed to operatively engage with an inner gear 13. However, the inner gear 13 is separated from the outer gear 14 by a cresent wall 11 formed in the circular recess at an upper portion as viewed in FIG. 2. For rotation with an engine, the inner gear 13 is coupled with a sleeve section of a converter hub which is rivetted to an outer shell of a pump impeller 8a of the torque converter 8. Since the pump impeller 8a is rotatable with the engine output shaft and the inner gear 13 is rotatable with the sleeve section of the converter hub secured to the pump impeller 8a, the inner gear 13 is driven by the engine and rotates about the main axis $O_1$ in a direction as indicated by an arrow shown in FIG. 1. The circular recess formed in the oil pump housing 12 is closed by an oil pump cover 16 of the pump casing.

As best seen in FIG. 1, the oil pump cover 16 is formed with an annular rib 16a receiving therein the oil pump housing 12. With a plurality of bolts 17, the oil pump cover 16 is secured to the oil pump housing 12. The oil pump cover 16 includes an integral flange section 18 extending radially outward from the annular rib 16a. This integral flange section 18 is secured to the transmission casing 2 by a plurality of bolts 19 to define an interface via which an oil is supplied to the oil pump 1 and a pressurized oil discharged by the oil pump 1 is supplied to a fluid regulator of a control valve assembly of the automatic transmission.

As shown in FIG. 1, the oil pump cover 16 is formed with an inlet passage 20 extending from an inlet opening 20a to a pump inlet port 20b and also with an outlet passage 21 extending from a pump discharge port 21a to an outlet opening 21b. Extending through the oil pump cover 16 are a plurality of circuit passages including a torque converter oil discharge passage 22, a torque converter oil supply passage 23, a high clutch pressure passage 24 and a reverse clutch pressure passage 25.

Figure 3:
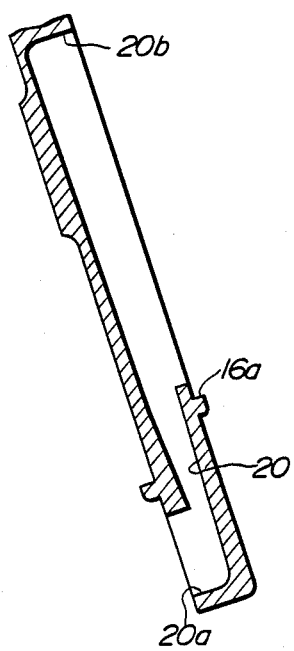
FIG. 3 is a section taken through the line III—III of FIG. 1 showing an inlet passage leading from an inlet opening to a pump inlet port.
Figure 4:
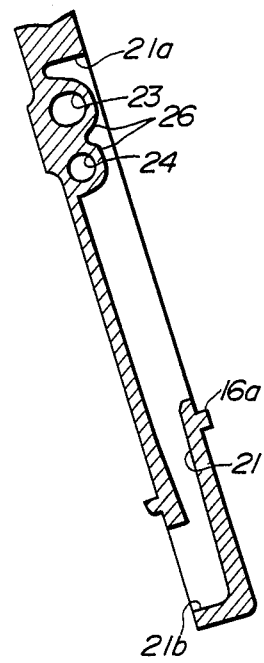
FIG. 4 is a section taken through the line IV—IV of FIG. 1 showing an outlet passage leading from a pump discharge port to an outlet opening.

As best seen in FIGS. 3 and 4, the inlet passage 20 and the outlet passage 21 extend radially inward of the annular rib 16a to connect inlet and outlet openings 21a and 21b disposed in the flange section 18 outside of the annular rib 16a with the pump inlet port 20b and the pump discharge port 21a disposed inside of the annular rib 16a. This passage structure has contributed to a reduction in diameter of the oil pump housing 12.

In FIG. 1, as viewed radially outward from the main axis $O_1$, there are no circuit passages extending radially outward crossing the pump inlet port 20b and thus there is no need to provide a flange section around that portion of the annular rib 16a which looks the main center $O_1$ beyond the pump inlet port 20b. However, that portion of the annular rib 16a which is lying on the inlet passage 20 is excluded. In other words, a cutout 18a is formed into the flange section 18 and a final drive pinion 10 on the counter shaft 10 is disposed in the vicinity of the annular rib 16a. This has resulted in a reduction in distance between the main axis $O_1$ and the auxiliary axis $O_2$ which the counter shaft 7 is rotatable about.

As best seen in FIG. 3, there is no passage extending across the pump inlet port 20b and the pump inlet port 20b has a substantially flat bottom wall, so that the effective flow area through the inlet passage 20 can be increased to its maximum. Thus, the formation of cavitation or noise caused thereby at high speed engine operation are prevented or at least minimized.

As best seen in FIG. 4, among all of the circuit passages 22, 23, 24 and 25, two passages 23 and 24 extend across the pump discharge port 21a through an elevated portion 26 from the bottom wall of the pump discharge port 21a. This elevated portion 26 adds to the structural rigidity of the portion where the pump discharge port 21a is disposed. Thus, oil leak from the pump discharge port 21a is prevented or at least reduced.

What is claimed is:

1. An oil pump comprising:
    a pump casing including a pump housing formed with a recess receiving therein movable pump elements including a pump element rotatable about an axis, and a pump cover secured to said pump housing, said pump cover including an integral flange section extending radially outward of said pump housing with regard to said axis;
    said pump cover being formed with an oil inlet opening and an oil outlet opening at said flange section, a pump inlet port and a pump discharge port, an inlet passage extending from said inlet opening to said pump inlet port, and an outlet passage extending from said pump discharge port to said outlet opening;
    said flange section being cutout at a portion disposed radially outward of said pump inlet port with regard to said axis.

2. An oil pump for a transaxle including a transmission casing, a main axis and an auxiliary axis which a final drive pinion on a counter shaft is rotatable about, said oil pump comprising:
    a pump casing including a pump housing formed with a recess receiving therein movable pump elements including a pump element rotatable about the main axis, and a pump cover secured to said pump housing, said pump cover including an integral flange section extending radially outward of said pump housing with regard to the main axis, said integral flange section being secured to the transmission;
    said pump cover being formed with an oil inlet opening and an oil outlet opening at said flange section to receive oil via the transmission casing and supply pressurized oil via the transmission casing, a pump inlet port and a pump discharge port, an inlet passage extending from said inlet opening to said pump inlet port, and an outlet passage extending from said pump discharge port to said outlet opening;
    said flange section being cutout at a portion disposed radially outward of said pump inlet port with regard to said axis to receive therein the final drive pinion.

3. An oil pump as claimed in claim 2, wherein said pump cover is formed with an elevated portion in said pump discharge port for increased rigidity of a portion of said pump cover where said pump discharge port is disposed.

4. An oil pump as claimed in claim 3, wherein said elevated portion is formed with at least one passage.

5. An oil pump for a transaxle including a transmission casing, a main axis and an auxiliary axis which a final drive pinion on a counter shaft is rotatable about, said oil pump comprising:
    a pump casing including a pump housing formed with a recess receiving therein an outer gear and an inner gear rotatable about the main axis, and a pump cover secured to said pump housing, said pump cover including an annular rib receiving therein said pump housing and an integral flange section extending radially outward of said annular rib with regard to said axis;
    said pump cover being formed with an oil inlet opening and an oil outlet opening at said flange section, a pump inlet port and a pump discharge port which are disposed inside of said annular rib, an inlet passage extending from said inlet opening to said pump inlet port, and an outlet passage extending from said pump discharge port to said outlet opening;
    said pump cover being formed with a plurality of circuit passages including at least one circuit passage crossing said pump discharge port, said pump cover being formed with an elevated portion in said pump discharge port through which said at least one circuit passage extends;
    said flange section being cutout at a portion disposed radially outward of said pump inlet port with regard to said main axis to receive therein the final drive pinion.

6. In an automatic transaxle:
    a transmission casing having a main axis;
    a counter shaft within said transmission casing and rotatable about an auxiliary axis extending in parallel to said main axis;
    a final drive pinion on said ounter shaft;
    an oil pump casing including a pump housing formed with a recess receiving therein movable pump elements including a pump element rotatable about the main axis, and a pump cover secured to said pump housing, said pump cover including an integral flange section extending radially outward of said pump housing with regard to the main axis, said integral flange section being secured to the transmission;
    said pump cover being formed with an oil inlet opening and an oil outlet opening at said flange section secured to said transmission casing, a pump inlet port and a pump discharge port, an inlet passage extending from said inlet opening to said pump inlet port, and an outlet passage extending from said pump discharge port to said outlet opening;
    said flange section being cutout at a portion disposed radially outward of said pump inlet port with regard to said axis to receive therein said final drive pinion.

* * * * *